March 28, 1939. W. T. ASHE ET AL 2,152,014
FOLDING SEAT
Original Filed Dec. 4, 1933   3 Sheets-Sheet 2
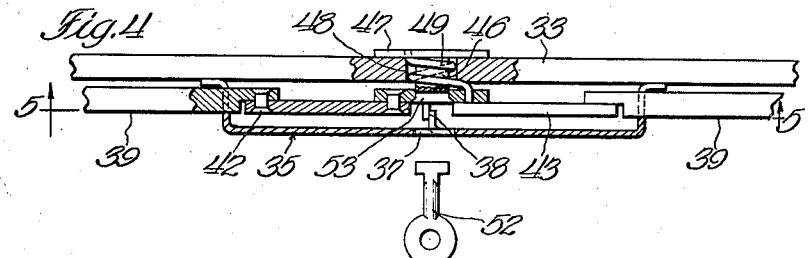
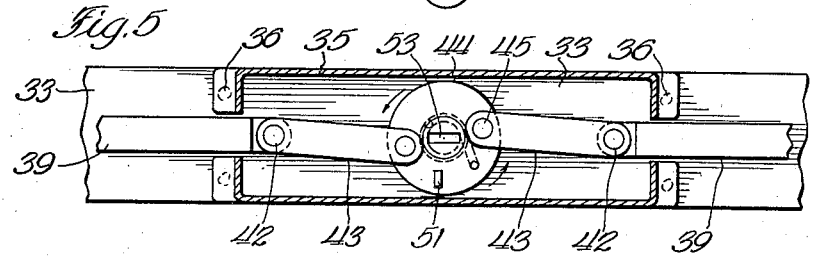
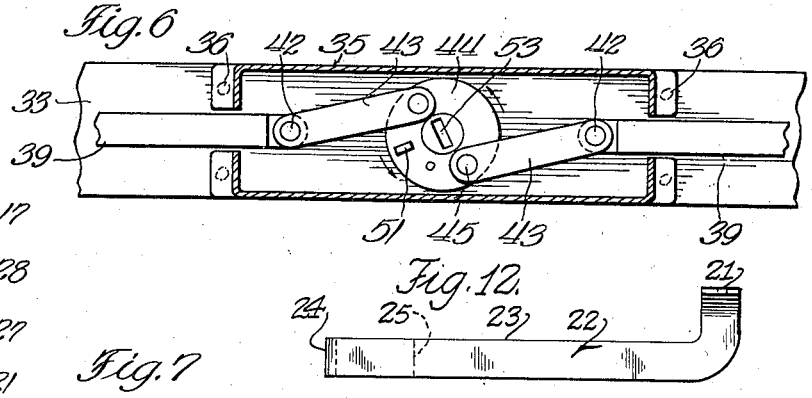
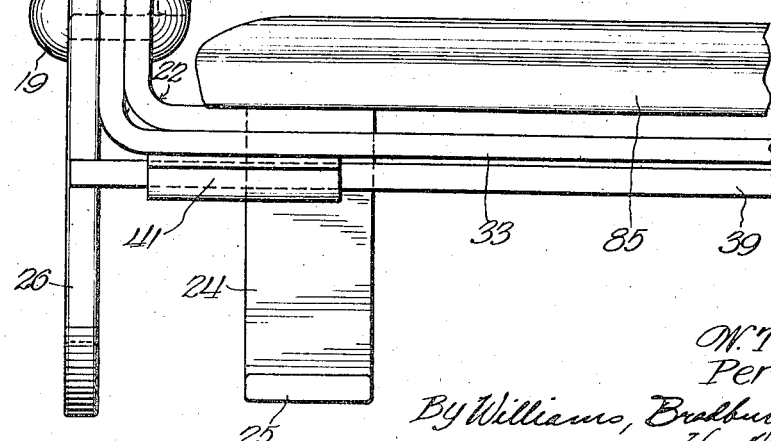
Inventors:
W. Thomas Ashe
Percy Baines
By Williams, Bradbury, McCaleb
& Hinkle
Attys.

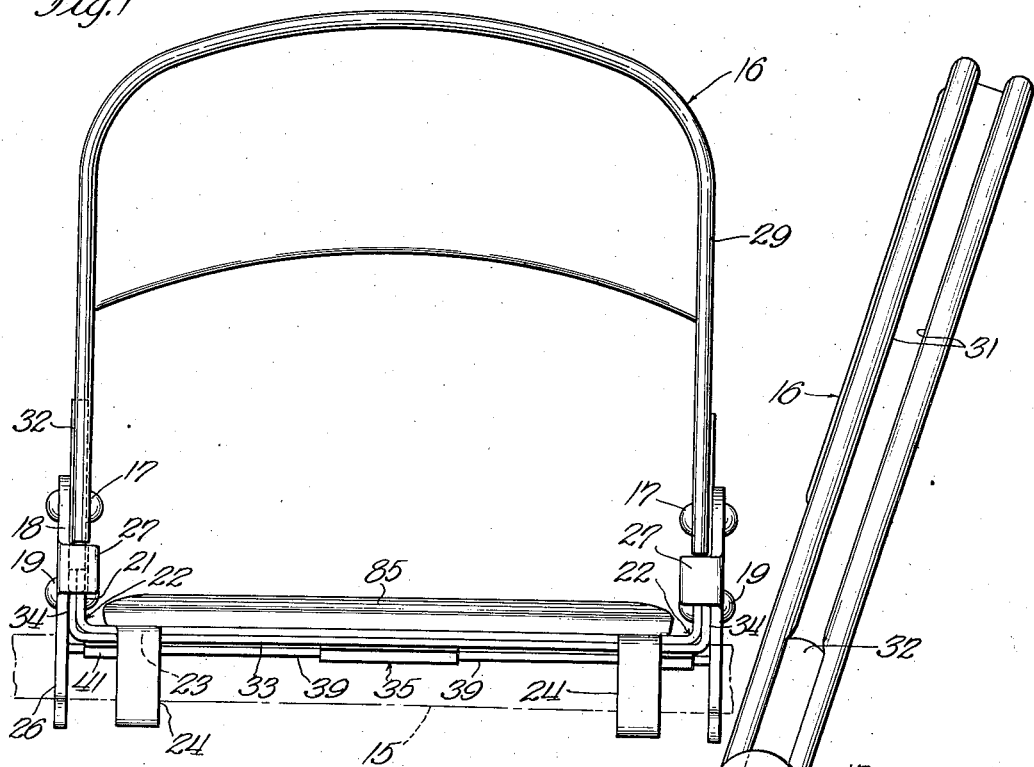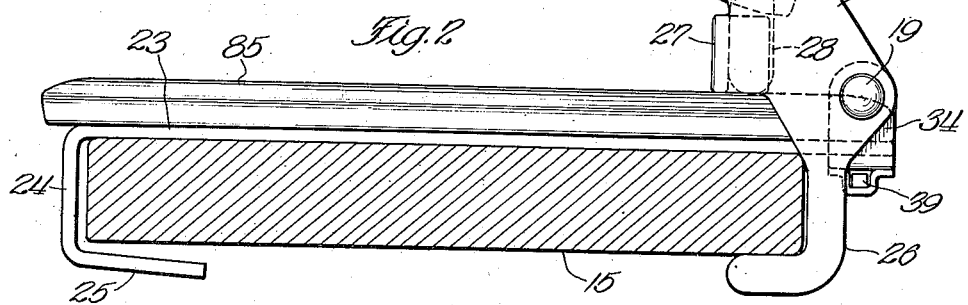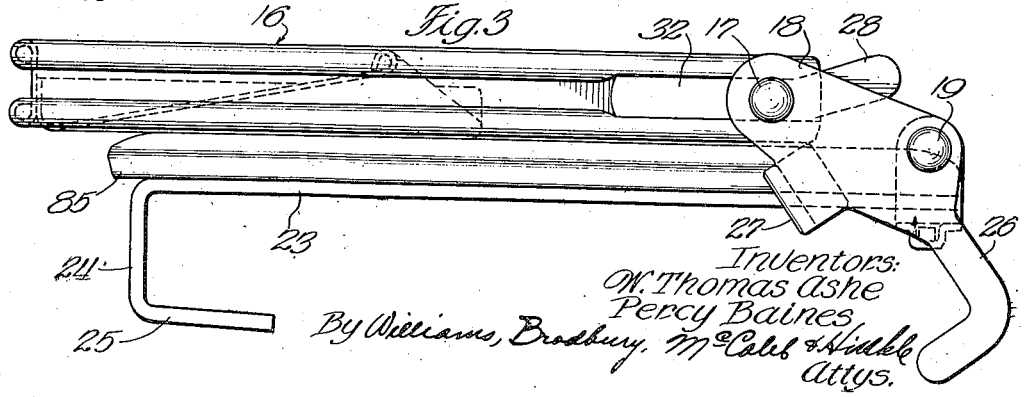

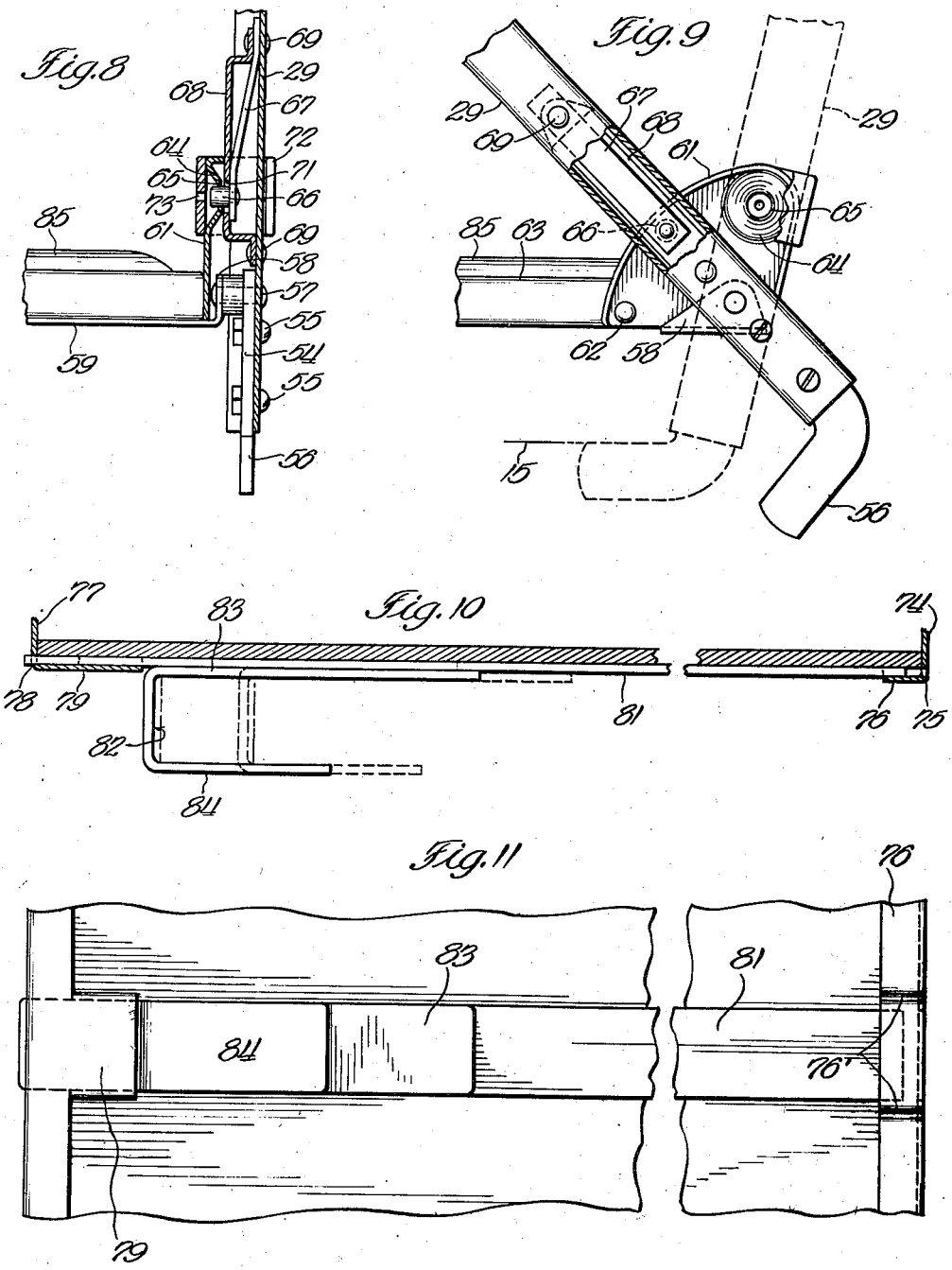

Patented Mar. 28, 1939

2,152,014

UNITED STATES PATENT OFFICE 2,152,014

FOLDING SEAT

William Thomas Ashe and Percy Baines,
Chicago, Ill.

Application December 4, 1933, Serial No. 700,862
Renewed January 12, 1938

8 Claims. (Cl. 155—133)

This invention relates to seats and has for an object the provision of a back rest adapted to be associated with backless benches or plank bleachers to which the back rest is detachably locked, to convert such backless benches or plank bleachers into comparatively comfortable seats.

Another object of the invention is the provision in such seats of bench clamping or engaging means movable into and out of clamping engagement with the bench or plank bleacher, and associated with means for locking the clamping means in clamping position.

A further object of the invention is the provision of a seat cover swivelly associated with a back rest, the back rest being adapted in operation to move a novel bench clamping device into clamping position where it is locked to prevent removal of the seat assembly from the bench without the use of the proper tool or key.

Other objects and advantages will appear from the following specification, reference being had to the accompanying drawings, in which:

Fig. 1 is a front elevation of a novel seat assembly embodying the features of the invention;

Fig. 2 is a side elevation of the seat assembly shown in Fig. 1;

Fig. 3 is a view similar to Fig. 2 showing the seat assembly removed from the bench or plank bleacher;

Fig. 4 is a fragmentary detail partially in section showing a novel locking means for securing the seat assembly to a bench or plank;

Fig. 5 is a cross section taken substantially on the line 5—5 of Fig. 4 and shows the locking means in the locked position;

Fig. 6 is a view similar to Fig. 5 showing the locking means in an unlocked position;

Fig. 7 is a fragmentary rear elevation of the seat assembly shown in the preceding views;

Fig. 8 is a fragmentary front elevation partially in section of a novel seat assembly employing a slightly different form of locking means;

Fig. 9 is a side elevation partially in section of the seat and lock assemblies shown in Fig. 8, showing in full lines the back rest in a partially folded position and in dotted lines showing the back rest in an upright position;

Fig. 10 is a fragmentary transverse section illustrating a removable bench or plank clamping means;

Fig. 11 is a fragmentary plan view of the bench clamping means shown in Fig. 10; and Fig. 12 is a plan view of a front clamp of the type shown in the seat assembly of Figs. 1 and 2.

To accomplish the foregoing objects, a back rest 16 is swivelly, as at 17, connected to a clamping means actuating arm 18 which in turn is swivelled as at 19 to an upturned arm 21 of a clamping member 22 at each side of the back rest 16. Each of these clamping members 22 extends inwardly laterally of the upstanding arm 21, then forwardly as at 23, downwardly as at 24, and rearwardly as at 25, to form a substantially U-shaped hook forwardly of the back rest.

A clamp 26 is integral with each arm 18 swiveled about the pivot bolt or rivet 19 to the upstanding arm 21 of the clamping member 22. Each arm 18 is provided with a lug or arm receiver 27 adapted to receive and to be engaged by a lug or arm 28 on the back rest 16 and depending therefrom below each bolt or rivet 17.

By means of the structure already described, the back rest 16 may be attached to a plank or bench 15 by so positioning the back rest in the position shown in Fig. 3 that the forward marginal portion of the plank is engaged between the substantially U-shaped hooks formed by the members 23 and 25. With the assembly in this position the back rest 16 is swung upwardly about the pivot bolts or rivets 17 until the depending lugs or arms 28 engage the lug receivers 27. Further movement of the back rest 16 upwardly will cause the clamping means actuating arms 18 to swing about the pivot bolts or rivets 19 in a clockwise direction as viewed in Fig. 2. Such movement of the arms 18 in a clockwise direction causes the clamps 26 depending from the arms 18 below the pivot bolts 19 to move forwardly about the pivot bolts 19 into clamping engagement with the marginal portion of the plank or bench 15 as shown in Fig. 2.

It will be understood that the back rest 16 may take various forms. One form which has been found suitable comprises a substantially inverted U-shaped frame member 29 having its opposite marginal portions rolled or beaded as at 31. Each of the parallel members 29 can then accommodate between the beaded portions 31 a bar 32 depending below the end of each parallel frame member. The depending portions of the bars 32 constitute the depending lugs 28 and the bars serve as rigid connectors between the back rest 16 and the clamping means actuating arms 18 when the lugs 28 are engaged with the lug receivers 27 in raising the back rest to cause the clamps 26 to swivel about the pivot bolts 19 in moving to the plank or bench clamping position shown in Fig. 2.

A frame member 33 is provided with upturned arms 34 at each end thereof. Each arm 34 is secured between the corresponding arm 21 and the clamping means actuating arm 18 by the pivot bolt or rivet 19. This frame member 33 carries intermediate its upturned ends 34 a lock housing or casing 35 suitably secured as at 36 to the frame member 33 and having lock bolt slots or apertures 36' at opposite ends thereof, a key slot 37, and an inwardly projecting stop lug 38.

The lock housing 35 encloses a suitable locking mechanism for dogging or locking the clamps 26 in the clamping position. As illustrated, this locking mechanism includes reciprocable lock bolts or dogs 39 extending outwardly in opposite directions from the lock housing 35 through the apertures 36' and through supporting guides 41 suitably secured adjacent opposite ends of the frame member 33. The bolts or dogs 39 are pivotally connected as at 42 to operating links 43 in the lock housing. These links 43 are adapted to be actuated by a spring urged disc or plate 44 pivotally secured as at 45 to the links 43 and rotatably carried at the inner end of a shaft or shank 46. The shaft 46 projects from a fixed mounting plate or disc 47 secured to the frame member 33, through an aperture 48 in the frame member 33, and into the lock housing 35.

A torsion spring 49 having one end secured to the fixed mounting plate 47 and having its other end fixed to the disc 44, is coiled about the shaft or shank 46. This spring 49 is so arranged that it tends to rotate the disc in a counterclockwise direction as viewed in Figs. 5 and 6 to urge the connecting links 43 and lock bolts 39 outwardly to a position where the lock bolts project beyond and rearwardly adjacent the clamps 26 to dog the clamps in clamping position when the back rest is assembled on a plank or bench.

In the locked position, a lug 51 on the disc 44 engages the lug 38 on the lock housing 35 to prevent further rotation of the disc 45 by, for example, force being exerted at the ends of the lock bars 39 in a direction longitudinally of the lock bars to release the clamps 26. In order to remove the back rest from the plank or bench, a key or other suitable tool 52 is inserted through the key slot 37 into a slot 53 in the disc 44 and is rotated in a direction to rotate the disc 44 in a clockwise direction as viewed in Figs. 5 and 6. Such rotation of the disc 44 in a clockwise direction retracts the lock bolts 39 sufficiently to cause the ends thereof to clear the clamps 26 and to permit the clamps to be moved about the pivot bolts or rivets 19 out of clamping engagement with the plank or bench 15.

As illustrated more particularly in Figs. 8 and 9, each of the parallel members 29 of the back rest 16 may be provided with an angle bar 54. One arm of the bar 54 is secured as at 55 to the lower end of the member 29. The other arm 56 of the bar 54 provides a clamp engageable with the plank 15 when the back rest is attached to the plank. The angle bars 54 are, by pivot bolts or rivets 57, swiveled to upturned arms 58 of a frame member 59 extending between the parallel members 29 of the back rest. In this manner the back rest and the clamps may be swiveled to the frame.

As further shown in Figs. 8 and 9, a substantially triangular plate 61 is secured as at 62 to a forwardly extending frame member 63 adjacent each parallel member 29 of the back rest. Each of these plates 61 is provided with a depression 64 concentric with an aperture 65 at the upper corner of the plate 61 for receiving a spring urged locking pin or bolt 66 when the back rest is raised and the clamps 56 are in a clamping position.

Each of these locking pins or bolts 66 as illustrated is actuated by a leaf spring or resilient member 67 secured to a parallel back rest member 29 and in a housing or casing 68 secured as at 69 to the member 29. The casing 68 is mounted in such a position that the pin or bolt 66 registers with an aperture 71 in the casing 68. Each casing 68 is so arranged on the back rest member 29 that when the back rest is in its raised position as illustrated in the dotted lines in Fig. 9, the aperture 71 in the casing 68 is aligned with the aperture 65 in the adjacent plate 61. In such aligned position the springs 67 will urge the locking pins or bolts 66 into the apertures 65 to dog or lock the back rest in the raised position and to lock the clamps 56 in the clamping position.

A channel-shaped member 72 is suitably secured to each plate 61 and has in its inner flange or face an aperture 73 registering with the aperture 65 and forming a key hole. The web or joining portion of each channel-shaped member 72 is of sufficient width to space the outer flange or face from the inner flange enough to accommodate the back rest member 29 carrying the lock casing 68 between the outer face or flange and the plate 61 inwardly adjacent the opposite or inner flange. The channel shaped members thus serve to brace and to support the back rest.

Thus, as shown in Figs. 8 and 9, the back rest is clamped in position on the plank or bench 15 and the clamping means is locked in clamping position. The clamping means may be released by inserting the proper tool or key successively in the slots 73 to depress the pins or bolts 66 out of engagement in the apertures 65, and swinging the back rest forwardly about the pivot bolts or rivets 57 causing the clamps 56 to move rearwardly out of clamping position.

As illustrated in Figs. 10 and 11, the forward clamps for the novel back rest of the invention may be removable. A rear frame member 74 having an aperture 75 therein is provided with a forwardly projecting lug or flange 76 crimped inwardly along spaced lines to provide a socket or groove 76'. A front frame member 77 having an aperture 78 therein is provided with a rearwardly projecting socket or groove 79. A bar 81 is slidably receivable in the sockets 76' and 79 and in the apertures 75 and 78. The bar 81 carries a substantially U-shaped clamp 82 having one parallel arm 83 secured to the bar 81 and having its spaced parallel arm 84 extending rearwardly for clamping about the forward marginal edge of a plank or board. The bar 81 may be assembled in place by inserting the end thereof in the socket 76' and sliding it rearwardly through the aperture 75 until the other or clamping end clears the rear edge of the socket 79. The forward end of the bar is then inserted in the socket 79 and the bar is moved to the forward position for the clamp 82. The bar 81 is slidable in the sockets 76' and 79 to accommodate planks or benches of a certain width, and may be replaced by other bars for clamping benches of different widths and thicknesses.

In each of the foregoing back rests an unholstered or other suitable seat covering 85 where desired may be secured to the frame or clamping means whereby to obviate sitting upon the relatively uncomfortable planks or boards. In this manner the seat covering and the back rest provides a foldable assembly that is convenient and comfortable.

Thus it will be seen that a back rest and locking means therefor may be associated with a backless plank or bench to convert such a plank or bench into a comfortable seat. By means of this novel back rest and lock therefor, bench bleachers and other types of plank seats in, for example, tents, stadiums, and other more or less temporary auditoriums, or in boats, may, without great additional cost and without substantial danger of loss of property, be converted into comfortable chair seats or, in other words, into seats having back rests.

The operation of the back rest will be understood from the foregoing description.

The details of construction as set forth above are susceptible to various modifications without departing from the spirit or scope of the invention which includes such modifications and the novel elements or combinations thereof set forth in the appended claims.

We claim:

1. In combination with a plank, a frame supported by said plank, means attached to said frame for securing it to the forward marginal portion of said plank, a clamp having a pivotal connection with said frame and swingable to and from clamping engagement with the rearward marginal portion of the plank, a back rest pivotally connected with said clamp and having a member engageable with an element thereon spaced from both pivots for swinging said clamp to clamping engagement with the rearward marginal portion of the plank and for limiting the movement of said back rest with respect to the clamp in one direction, and key operable means for locking said clamp in clamping engagement with said plank.

2. In combination with a plank, a frame supported on said plank, means attached to said frame for securing it to the forward marginal portion of the plank, a clamp having a pivotal connection with said frame for securing said frame to the rearward marginal portion of the plank, means for urging said clamp about its pivotal connection with said frame toward clamping position with the rearward marginal portion of the plank, a back rest having a pivotal connection with said clamp and adapted to swing between a position overlying said plank and an upstanding position, said back rest in swinging to said upstanding position engaging said means for urging said clamp about its pivotal connection with said frame toward clamping position with the rearward marginal portion of the plank, and automatically operable locking means for locking said clamp in clamping position when said back rest reaches its upstanding position.

3. In combination with a plank, a frame supported by said plank; a front clamp secured to said frame and clampingly engaging the forward marginal portion of said plank; a member having a pivotal connection with said frame and including a rear clamp at one side of said pivotal connection for engaging the rearward marginal portion of said plank, and a clamp operating arm at the opposite side of said pivotal connection for swinging said rear clamp to and from clamping engagement with the rearward marginal portion of said plank; a back rest having a pivotal connection with said clamp operating arm and including a member engageable with an element on said clamp operating arm at a position intermediate the said pivotal connections for swinging said rear clamp to clamping position and for limiting the movement of said back rest with respect to said arm in one direction; and a lock secured to said frame and including means operating a dogging member for engaging said rear clamp to lock it in clamping position.

4. An attachment for a plank, comprising a frame, a front clamp secured to said frame and depending therefrom for clampingly engaging the forward marginal portion of the plank; a member having a pivotal connection with said frame and including a rear clamp at one side of said pivotal connection for clampingly engaging the rearward marginal portion of the plank, and a clamp operating arm at the opposite side of said pivotal connection for swinging said rear clamp to and from clamping position; a back rest having a pivotal connection with said clamp operating arm and including a member engageable with an element on said clamp operating arm at a position intermediate the said pivotal connections for swinging said rear clamp to clamping position and for limiting the movement of said back rest with respect to said arm in one direction; and a lock secured to said frame and having means operating a dogging member for engaging said rear clamp to lock it in clamping position.

5. An attachment for a plank, comprising a pair of spaced clamps, a clamp supporting member extending therebetween and connected thereto, said clamps clampingly engaging opposite marginal portions of a plank, one of said clamps having a pivotal connection with said clamp supporting member, whereby the pivoted clamp is swingable between clamping and non-clamping positions, and a back rest having a pivotal connection with the pivoted clamp and including a clamp operating member for engaging with an element on said pivoted clamp to urge it to its clamping position.

6. A back rest for a bleacher or like seat, comprising a frame positionable on a bleacher or like seat, a front clamp, means on said frame for slidably securing said front clamp thereto, a rear clamp having a pivotal connection with said frame, said front and rear clamps being adapted to clamp said frame on the bleacher or like seat, a back member pivoted on said rear clamp and swingable between a position overlying said frame and an upstanding position, means on said back rest and rear clamp for urging said rear clamp to its clamping position, and reciprocable means on said frame for dogging said rear clamp in clamping position, whereby the entire assembly is releasably locked on said bleacher or like seat.

7. An attachment for a plank seat comprising a frame supported on said plank seat, plank clamping means depending from said frame and including a clamp movable to and from clamping relationship with the plank seat, a back rest, said clamping means being pivoted on said frame and secured to said back rest for mounting said back rest to swing between a position overlying the plank seat and an upstanding position at one side of said plank seat, cooperating means on said back rest and on said clamping means for swinging said clamp toward clamping relationship with said plank seat when said back rest is swung to its upstanding position, and locking means for releasably locking said clamp in its clamping relationship with said plank seat to prevent removal of the attachment from the plank seat.

8. An attachment for a plank seat comprising a frame adapted to be supported on said plank seat, means depending from said frame for securing it on said plank seat and including an operative plank engageable member movable to and from engaged relationship with said plank seat, a back rest, means carrying said operative plank engageable member and pivoted on said frame and operatively connected with said back rest for mounting said back rest to swing between a position overlying the plank seat and a position at one side thereof, cooperating means on said back rest and on said pivoted means for operating said pivoted means and said plank engageable member to move the latter into engaged relationship with said plank seat when said back rest is swung to its upstanding position, and locking means for releasably locking said depending securing means in engaged relationship with said plank seat to prevent removal of the attachment from the plank seat.

W. THOMAS ASHE.
PERCY BAINES.